United States Patent Office 3,292,973
Patented Dec. 20, 1966

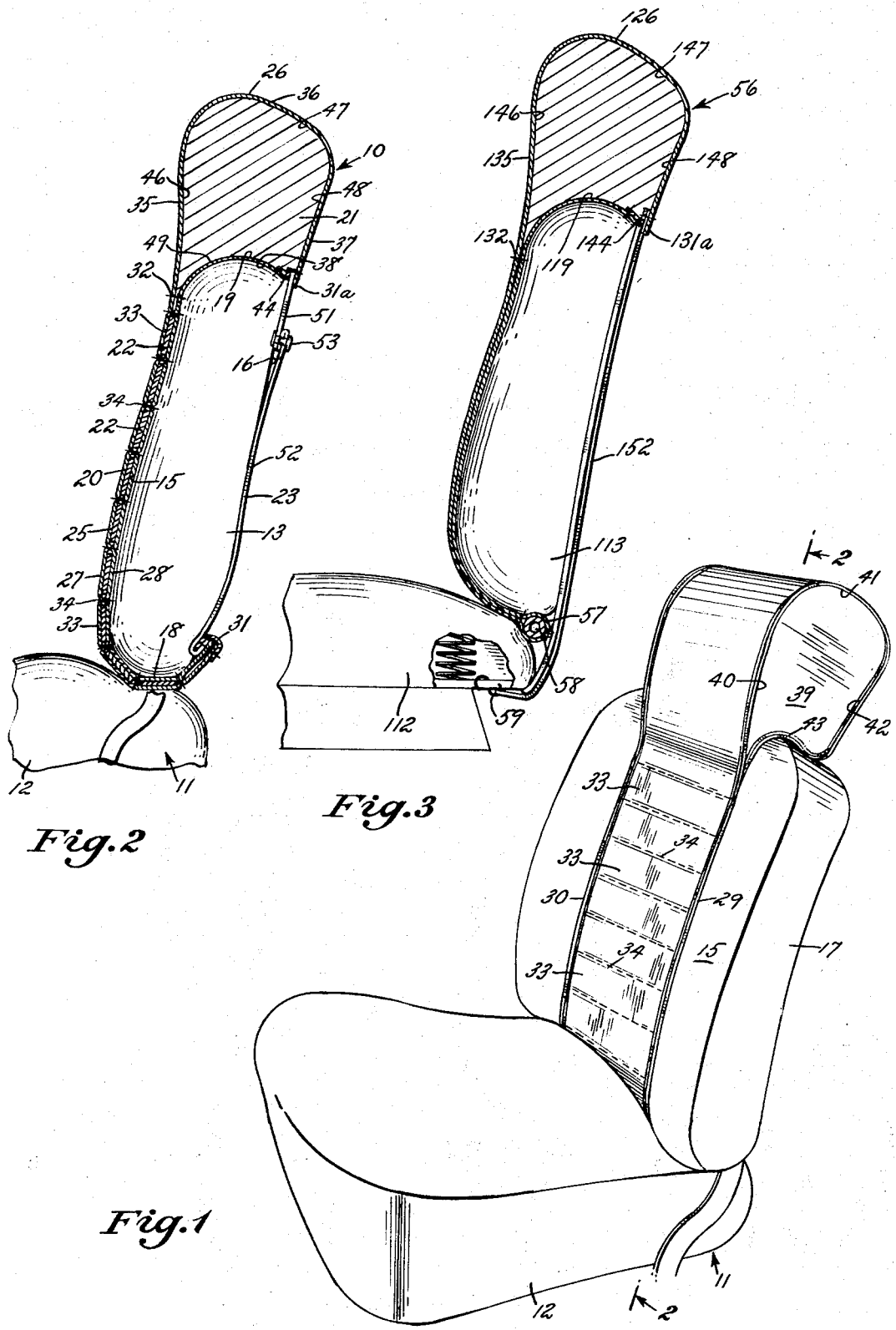

3,292,973
AUTO SEAT HEADREST CONSTRUCTIONS
Edward A. Cogut, 83 Grace Ave.,
Great Neck, N.Y. 11020
Filed Nov. 22, 1965, Ser. No. 509,010
1 Claim. (Cl. 297—397)

This invention relates generally to the field of automotive seating, and more particularly to an improved headrest construction which may be installed as an accessory upon the front seat or seats of an automobile to support the head of the driver or passenger during longer trips.

It is among the principal objects of the present invention to provide an improved construction which may be conveniently fabricated at low cost which is substantially cheaper than prior art constructions, thereby permitting consequent wide sale, distribution and use.

Another object of the invention lies in the provision of an improved automotive seat headrest construction which may be conveniently installed by motorists having only ordinary skill, and without resort to tools.

Yet another object of the invention lies in the provision of an improved automotive seat headrest construction which may be conveniently fabricated from automotive seat cover materials, and with an almost total absence of metallic parts.

A further object of the invention lies in the provision of automotive seat headrest construction which at least partially maintains itself in proper position by normal pressure of the back of the user against the seat back or squab.

Still another object of the invention lies in the provision of an improved construction of the class described which, with minor modification, may be employed with a variety of types of automotive seat construction, including those in which the back or squab is formed integrally with the lower cushion portion thereof.

A feature of the disclosed embodiments lies in the unusually attractive appearance of the same.

Another feature of one of the embodiments lies in the incorporation of horizontally disposed stiffening elements which serve to support the back of the user where the spring modulus of the back cushion or squab is excessively low.

These objects and features, as well as other incidental ends and advantages, will more fully appear in the progress of the following disclosure, and be pointed out in the appended claim.

In the drawing, to which reference will be made in the specification, similar reference characters have been employed to designate corresponding parts throughout the several views.

FIGURE 1 is a view in perspective of an embodiment of the invention in position upon a conventional folding type front seat.

FIGURE 2 is a vertical central sectional view of the embodiment shown in FIGURE 1.

FIGURE 3 is a corresponding vertical central sectional view showing a second embodiment of the invention.

In accordance with the first embodiment of the invention, the device, generally indicated by reference character 10 is suitable for use in conjunction with a conventional folding type seat 11 including a horizontal seat cushion element 12 and a back portion or squab 13. This type of seat is conventionally employed as a front seat in two door sedans, club coupes, convertibles and other body styles which require the folding forward of the seat back in order to gain access to the rear portion of the tonneau. This construction is also used in four door sedans employing so-called reclining seats, and is distinguished by the fact that the seat back portion or squab is connected to the horizontal seat cushion element 12 only at two axially aligned points. As is usual with this construction, the seat back portion 13 includes a front surface 15, a rear surface 16, side surfaces 17, a lower surface 18 and an upper surface 19.

The first embodiment 10, as has been mentioned, is preferably formed principally from synthetic resinous seat cover materials, in the interest of lower production cost. It includes a casing element 20, a cushion element 21, slat elements 22 and securing means 23.

The casing element 11 includes a planar seat-engaging member 25 and a cushion-enclosing member 26. The member 25 is of two-ply thickness, including a forward ply or lamina 27 and an abutted rear ply or lamina 28. The plies 27–28 are interconnected by side edge bindings 29 and 30, a lower edge binding 31 and an uppermost line of horizontally disposed stitching 32. A plurality of horizontally disposed elongated pockets 33 are formed by parallel lines of stitching 34, the slat elements 22 being disposed therein prior to the stitching operation.

Referring to FIGURE 2, the rear ply 28 is of identical configuration, and if desired, may be provided with an exposed rearward surface (not shown) capable of interlocking with the nap of the fabric forming the front surface 15.

The cushion-enclosing member 26 is partially formed by continuations of the plies 27–28 (again best seen in FIGURE 2), the same forming a forward wall 35, an upper wall 36, a rear wall 37 and a lower wall 38. Stitched to the walls 35–38 are a pair of sidewalls, one of which is indicated by reference character 39, each wall having a corresponding forward edge 40, upper edge 41, a rear edge 42 and lower edge 43 which is generally curved to conform to the shapes of the upper part of the seat back portion 13. Slide fastener means 44 interconnects the rear wall 37 and lower wall 38 to form an opening permitting insertion of the cushion element 21 which is preferably formed from lightweight resilient cellular material such as foam rubber, polyurethane foam, and similar materials. The cushion element is contoured such that it will be in substantially unstressed condition after insertion within the cushion-enclosing member 26, and is thus generally rectangularly shaped to include a forward surface 46, an upper surface 47, a rear surface 48 and a shaped lower surface 49.

The securing means 23 serves to maintain the device 10 in the position shown in FIGURES 1 and 2, and thus interconnects the cushion-enclosing member 26 across the rear surface 16 of the back portion 13 to interconnect the same with the lower edge of the seat-engaging member 25. It includes one or more tab members 51 secured to the lower edge binding 31a adjacent the slide fastener means 44, and having one-half of complementary snap fastener means 53 thereon. A corresponding number of elastic straps 52 are secured at the upper end thereto, the lower end thereof having stitch means engaging the binding 31.

To install the device 10 it is only necessary to move the seat back portion 13 forwardly to permit the lower edge binding 31 to be inserted between the seat back portion 13 and the horizontal seat cushion element 12, whereby the means 53 may be interconnected as shown in FIGURE 2. Owing to the resilient nature of the elastic straps 52, the device will normally maintain itself in proper position.

During use, the pressure of the back of the user against the front ply 27 will prevent the cushion element 21 being pushed rearwardly. Thus, the device serves as an effective preventive structure to reduce the possibility of "whiplash" action to which the neck of the user is subjected should the car be struck violently from the rear.

Turning now to the embodiment illustrated in FIG-

URE 3, and generally designated by reference character 56, parts corresponding to those of the principal form have been designated by similar reference characters with the additional prefix "1."

This embodiment is particularly adapted for use in conjunction with conventional front seat construction employed in four door sedans wherein the seat back portion is rigidly interconnected to a supporting frame, the frame also supporting the seat cushion. The frame, above mentioned, normally terminates above the level of the floor, to provide space for the feet of the rear seat passenger, and access can be had to the lower surface of the seat cushion through this space.

To accommodate for this structure, the device 56 includes a single transverse pocket 57 immediately above the lower edge binding 131 in which there is disposed a cardboard tube of considerable diameter. The straps 152 are modified to include hooks 59 adapted to engage portions of the spring construction of the seat cushion element 112 to provide an equivalent tensioning action. During installation, the tube 58 is positioned in the interstice formed beneath the back portion 113 and rearwardly of the seat cushion element 112 in the manner shown in FIGURE 3 to achieve the equivalent tension of the embodiment 10.

I wish it to be understood that I do not consider the invention limited to the precise details of structure shown and set forth in this specification, for obvious modifications will occur to those skilled in the art to which the invention pertains.

I claim:

Auto seat headrest construction comprising: a casing element, a cushion element, and securing means; said casing element including a first planar flexible member adapted to overlie the forwardly disposed surface of an automobile seat back, a second cushion enclosing member interconnected to said first planar member at an upper edge thereof and adapted to overlie the upper surface of said automobile seat back; said securing means including strap members interconnecting said second cushion enclosing member and said first planar member, and adapted to overlie the rearwardly disposed surface of said seat back to maintain said cushion enclosing member upon an unwardly disposed surface of said seat back, said securing means including a resilient component, and passing over a rearwardly disposed surface of said seat back and interconnecting said first planar member and said second cushion enclosing member; said first planar member being of two ply construction and being subdivided into a series of horizontally disposed pockets, there being a corresponding number of relatively stiff elongated slat members disposed within each one of said pockets.

References Cited by the Examiner

UNITED STATES PATENTS

| | | | |
|---|---|---|---|
| 2,223,861 | 12/1940 | Wagner | 297—231 X |
| 2,867,266 | 1/1959 | Vogler | 297—397 X |
| 3,043,626 | 7/1962 | Regua | 297—397 |
| 3,046,057 | 7/1962 | Smetko | 297—397 |
| 3,093,407 | 6/1963 | Wilson | 297—460 |
| 3,195,953 | 7/1965 | Zacks | 297—397 |

FOREIGN PATENTS 90,890  2/1958  Norway.

FRANK B. SHERRY, *Primary Examiner.*

CASMIR A. NUNBERG, *Examiner.*